(12) United States Patent
Kitanaka

(10) Patent No.: US 8,688,301 B2
(45) Date of Patent: Apr. 1, 2014

(54) POWER CONVERTER

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 782 days.

(21) Appl. No.: 12/598,435

(22) PCT Filed: Jun. 28, 2007

(86) PCT No.: PCT/JP2007/063043
§ 371 (c)(1),
(2), (4) Date: Nov. 2, 2009

(87) PCT Pub. No.: WO2009/001468
PCT Pub. Date: Dec. 31, 2008

(65) Prior Publication Data
US 2010/0076638 A1    Mar. 25, 2010

(51) Int. Cl.
*B60L 11/00* (2006.01)
*G06F 7/00* (2006.01)

(52) U.S. Cl.
USPC .......... 701/22; 361/30; 361/71; 361/93.1; 320/101; 363/95; 318/101; 318/400.21; 290/1 R; 440/84

(58) Field of Classification Search
USPC .......... 701/22; 361/30, 31, 71, 93.1; 318/139, 318/400.15, 400.21, 490, 432, 716, 760, 318/721, 727, 101; 369/226; 388/804; 180/65.1; 290/1 R; 440/84; 320/101; 363/95
See application file for complete search history.

(56) References Cited

U.S. PATENT DOCUMENTS

| | | | |
|---|---|---|---|
| 3,790,874 A * | 2/1974 | Klimo | 318/490 |
| 4,241,926 A * | 12/1980 | Kusaka et al. | 369/226 |
| 5,742,496 A * | 4/1998 | Tsutsumi | 363/95 |
| 6,121,735 A * | 9/2000 | Igeta et al. | 318/101 |
| 6,153,993 A | 11/2000 | Oomura et al. | |
| 6,278,256 B1 | 8/2001 | Aoyama | |
| 2002/0163319 A1* | 11/2002 | Kaneko et al. | 318/727 |

(Continued)

FOREIGN PATENT DOCUMENTS

| | | |
|---|---|---|
| JP | 62-018984 A | 1/1987 |
| JP | 62-117226 A | 5/1987 |

(Continued)

OTHER PUBLICATIONS

International Search Report of Application No. PCT/JP2007/063043 dated Sep. 25, 2007.

(Continued)

*Primary Examiner* — Tuan C. To
*Assistant Examiner* — Yuri Kan
(74) *Attorney, Agent, or Firm* — Buchanan Ingersoll & Rooney PC

(57) ABSTRACT

In a power converter a controller determines that an AC motor is in an abnormal state when a voltage of each phase of the AC motor detected by a voltage detector is in an unbalanced state where the voltage exceeds a predetermined value, and turns an opening/closing unit OFF to prevent damage generated in the AC motor from becoming worse. Moreover, the controller determines abnormality of the opening/closing unit based on a current of each phase detected by a current detector, and the controller performs control to reduce the number of revolutions of the AC motor upon determining that at least one of the AC motor and the opening/closing unit is in an abnormal state.

12 Claims, 1 Drawing Sheet

(56) References Cited

U.S. PATENT DOCUMENTS

| | | | |
|---|---|---|---|
| 2003/0008573 A1* | 1/2003 | Katayama | 440/84 |
| 2003/0175017 A1* | 9/2003 | Pelonis | 388/804 |
| 2004/0232865 A1* | 11/2004 | Suzuki | 318/439 |
| 2005/0049770 A1 | 3/2005 | Liu et al. | |
| 2006/0007615 A1* | 1/2006 | Ochiai et al. | 361/71 |
| 2006/0012329 A1* | 1/2006 | Aoki et al. | 318/721 |
| 2006/0049792 A1* | 3/2006 | Chen et al. | 318/716 |
| 2006/0076914 A1* | 4/2006 | Yaguchi | 318/432 |
| 2006/0122796 A1 | 6/2006 | McLaughlin et al. | |
| 2006/0274468 A1* | 12/2006 | Phadke | 361/93.1 |
| 2007/0138996 A1* | 6/2007 | Kobayashi | 320/101 |
| 2007/0211396 A1* | 9/2007 | Gunji | 361/31 |
| 2007/0236019 A1* | 10/2007 | Chen | 290/1 R |
| 2009/0108794 A1* | 4/2009 | Ochiai et al. | 318/760 |
| 2009/0145675 A1* | 6/2009 | Ichikawa | 180/65.1 |
| 2009/0160380 A1* | 6/2009 | Yamada et al. | 318/400.15 |
| 2010/0076638 A1* | 3/2010 | Kitanaka | 701/22 |

FOREIGN PATENT DOCUMENTS

| | | | |
|---|---|---|---|
| JP | 6-339290 A | 12/1994 | |
| JP | 8-182105 A | 7/1996 | |
| JP | 2006-050803 A | 2/2006 | |
| JP | 2006-515500 A | 5/2006 | |
| JP | 2006-158182 A2 | 6/2006 | |
| JP | 2006-271153 A | 10/2006 | |
| JP | 2006-311692 A | 11/2006 | |
| JP | 2007-028852 | 2/2007 | |
| WO | WO 2005/025031 A | 3/2005 | |

OTHER PUBLICATIONS

Written Opinion of the International Searching Authority of Application No. PCT/JP2007/063043 dated Sep. 25, 2007.

Japanese Office Action (with English language translation) dated Jul. 29, 2008.

Interrogation issued in the corresponding Japanese Patent Application No. 2008-502765 dated Dec. 22, 2009, and an English Translation thereof.

Office Action from Japanese Patent Office issued in Applicant's corresponding Japanese Patent Application No. 2008-502765, dated Jun. 15, 2010, with English-language translation.

Extended Search Report from European Patent Office dated Nov. 7, 2013, issued in corresponding European Patent Application No. 07828154.0. (9 pages).

* cited by examiner

POWER CONVERTER

TECHNICAL FIELD

The present invention relates to a power converter that is suitable for driving a permanent-magnet synchronous motor mounted in an electric vehicle.

BACKGROUND ART

A permanent-magnet synchronous motor (hereinafter, simply "motor", except when it is necessary to distinguish the permanent-magnet synchronous motor from other motors) is different from an induction motor that is commonly used in the following points:

(1) Because magnetic flux is established by a permanent magnet incorporated in a rotor, an exciting current is unnecessary.

(2) Because no current flows through a rotor unlike the induction motor, no secondary copper loss is generated.

(3) Because the permanent-magnet synchronous motor has the characteristics (1) and (2), this motor is known as an efficient motor.

Although the induction motors have been commonly used in electric vehicles, use of the permanent-magnet synchronous motors that have the above mentioned better characteristics is recently considered to further improve the efficiency.

Generally, in an electric vehicle, generally a plurality of cars connected to one another. Moreover, a plurality of power converters and motors are decentrally mounted on the plural cars. Therefore, even if some of the power converters of the electric vehicle fail and some of the motors fall into an inoperative state, the electric vehicle can keep running by the remaining working power converters and motors.

In the permanent-magnet synchronous motor, unlike in the induction motor that is commonly used, even if power is not supplied from outside, that is, even if the power converter comes to a stop, an induced voltage is inevitably generated at a terminal of the motor during rotation of the rotor by an action of magnetic flux of the permanent magnet incorporated in the rotor of the motor. As a result, even if the power converter fails and stops operating while the electric vehicle is running, the rotor of the motor keeps on rotating due to the rotation of the wheel that is directly connected to the rotor while the electric vehicle is running. Accordingly, the motor keeps generating an induced voltage that is proportional to the number of revolutions of the motor.

Because persons skilled in the art know this event well, the power converter is designed to withstand the induced voltage.

A short-circuit fault can occur in the power converter. When such short-circuit fault occurs, a circuit path that short-circuits the induced voltage from the motor may be constituted. That is, a short-circuit current can flow in the motor due to the induced voltage.

Practically, the present inventors have confirmed that when terminals of a motor designed for a certain electric vehicle are short-circuited under a condition of the maximum number of revolutions, a short-circuit current up to several hundreds amperes could be generated.

In the case of a system that is driven by one motor such as an electric car, when the short-circuit fault described above occurs in the power converter, the vehicle immediately falls into a non-operating state, and rotation of the motor is stopped. As a result, the short-circuit current quickly decays.

In the electric vehicle to which the present invention is applied, however, even when the short-circuit fault occurs in some of the power converters during running, the electric vehicle keeps running by the remaining operating power converters and motors. As a result, the short-circuit current due to the induced voltage of the motor keeps flowing through the faulty portion (short-circuit location) of the power converter where the short-circuit fault has occurred. If this state is left unsettled, there is a possibility that the damage of the faulty portion of the power converter becomes worse or the faulty portion or the motor becomes hot or in worst cases burns, and this can cause a serious problem.

Naturally, in the case of the conventional induction motor, no short-circuit current flows even if terminals of the induction motor during rotation are short circuited. Therefore, the problem of this kind does not exist in the conventional induction motor.

To solve this problem, Patent Document 1 mentioned below teaches providing a contactor. The contactor is an opening/closing unit for electrically isolating a connection between an inverter as a power converter that drives and controls a permanent-magnet synchronous motor and the motor. Accordingly, the damage of the inverter does not become worse by an induced voltage of the motor when the inverter breaks down while an electric vehicle is running. Moreover, when a controller detects a trouble of the inverter, the controller turns the contactor OFF to isolate the inverter and the motor from each other.

Patent Document 1: Japanese Patent Application Laid-open No. H8-182105

DISCLOSURE OF INVENTION

Problem to be Solved by the Invention

Even when the controller turns the contactor OFF when the inverter breaks down, it is conceived that an arc current continuously flows even if the contactor is turned OFF due to a fact that a contact incorporated in the contactor may not turn OFF because the contactor has failed or the short-circuit current has exceeded the interruption capacity of the contactor. If the contact does not turn OFF the short-circuit current cannot be interrupted.

When a short circuit occurs between the contactor and the motor, or between windings in the motor, the short circuit is not eliminated even if the contactor located between the inverter and the motor is turned OFF. Thus, it is naturally impossible to interrupt the short-circuit current caused by an induced voltage in the motor. This problem cannot be solved by the method disclosed in Patent Document 1.

The present invention has been achieved in view of the above problems, and an object of the invention is to provide a power converter capable of preventing damage of the power converter or a motor from becoming worse even when a current cannot be interrupted even if a contactor is turned OFF or when a short circuit occurs between a contactor and a motor or between windings in the motor.

Means for Solving Problem

To solve the above problems and to achieve the above objects, according to an aspect of the present invention there is provided a power converter including an inverter that converts a DC voltage or an AC voltage to an AC voltage of an arbitrary frequency to drive an AC motor, an opening/closing unit that is connected between the inverter and the AC motor, and a controller that controls the inverter. A voltage detector is provided between the opening/closing unit and the AC motor. The controller performs a predetermined procedure when a voltage detected by the voltage detector does not satisfy a predetermined condition.

Effect of the Invention

According to the power converter of the present invention, when the opening/closing unit is connected between the inverter and the AC motor and the voltage detector is provided between the opening/closing unit and the AC motor, the controller that controls the inverter conducts a predetermined operation when a voltage detected by the voltage detector does not satisfy a predetermined condition. Therefore, it is possible to prevent the damage of the power converter or the motor from becoming worse even when a current cannot be interrupted even if a contactor is turned OFF or when a short circuit occurs between the contactor and the motor or between windings in the motor.

Figure 1:
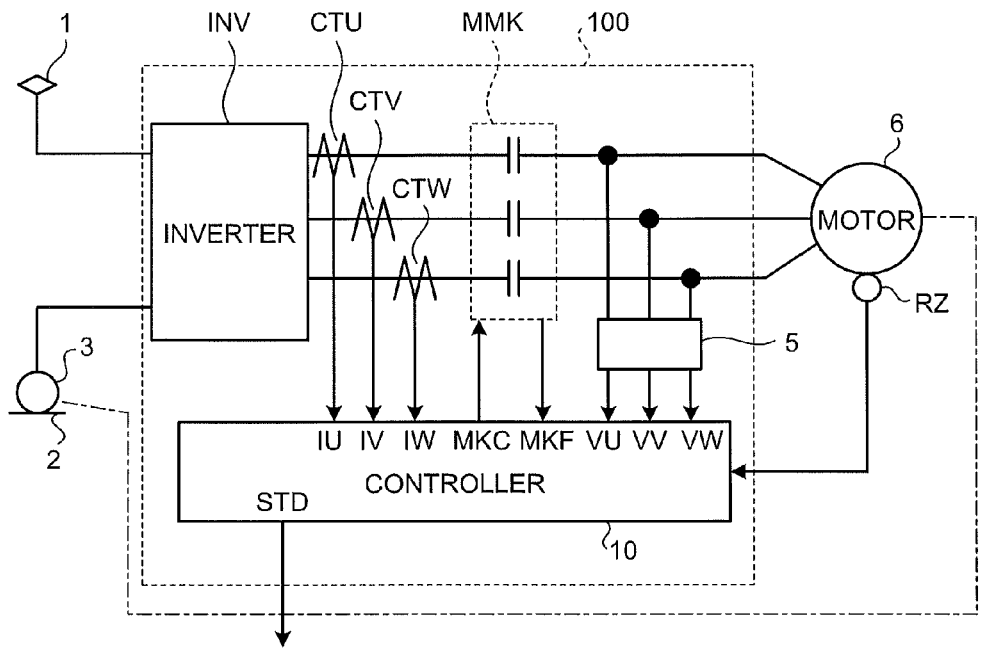
FIG. 1 is an example of a structure of a power converter according to an embodiment of the present invention.

EXPLANATIONS OF LETTERS OR NUMERALS 1 current collector
2 rail
3 wheel
5 voltage detector
6 AC motor
10 controller
20 current presence/absence determining unit
30 waveform determining unit
100 power converter
INV inverter
CTU, CTV, CTW current detector
MMK contactor
RZ rotation detector
51, 54 NOT circuit
52, 55 AND circuit
53 OR circuit

BEST MODE(S) FOR CARRYING OUT THE INVENTION

Exemplary embodiments of a power converter according to the present invention will be explained below in detail with reference to the accompanying drawings. The present invention is not limited thereto.

Embodiments (Structure of Power Converter)

FIG. 1 is an example of a structure of a power converter according to an embodiment of the present invention. A power converter 100 shown in FIG. 1 includes at least an inverter INV, current detectors CTU, CTV, and CTW, contactors MMK, a voltage detector 5, and a controller 10.

As shown in FIG. 1, an input end of the power converter 100, that is, an input end of the inverter INV is connected to a current collector 1 and to a rail 2 through a wheel 3. DC power collected from the current collector 1 and the rail 2 through the wheel 3 is input to the inverter INV. The inverter INV converts the input DC voltage into AC voltage of an arbitrary frequency and drives an AC motor. It is preferable to use a voltage-source PWM inverter as the inverter INV. Because the structure of the voltage-source PWM inverter is known, detailed explanations thereof will be omitted.

The current detectors CTU, CTV, and CTW are provided in each phase on an output end of the inverter INV. Detected currents IU, IV, and IW are input to the controller 10. The contactors MMK that are opening/closing units are provided at subsequent stages of the current detectors CTU, CTV, and CTW. The current detectors can be provided for all of the three phases as shown in FIG. 1, or can be provided for any two of the phases. When the current detectors are provided for any two of the phases, a current of the remaining one phase having no current detector can be calculated based on currents flowing through these arbitrary two phases.

When a closing signal MKC from the controller 10 is turned ON, a closing coil of the contactor MMK is excited, main contacts provided on three phases are closed. Alternatively, when the closing signal MKC is turned OFF, excitation of the closing coil is stopped and the main contacts are opened. A state of the main contact of the contactor MMK is input to the controller 10 as a contact state signal MKF. The contact state signal MKF that is input to the controller 10 can also be obtained by a signal from an auxiliary contact that is mechanically coupled to the main contact, for example.

The voltage detector 5 is provided at a subsequent stage of the contactor MMK, and detected voltages VU, VV, and VW of the three phases are input to the controller 10. An AC motor 6 is connected to an output end of the power converter 100 located on the side of the subsequent stage of the contactor MMK. A rotating state of the AC motor 6 is detected by a rotation detector RZ, and is input to the controller 10. A so-called sensorless control system for controlling the AC motor 6 without using the rotation detector RZ has been in practical use. When the sensorless control system is employed, the rotation detector RZ is unnecessary.

As described above, the power converter according to this embodiment shown in FIG. 1 constitutes a driving apparatus for an electric vehicle, which rotates the wheel 3 that is mechanically coupled to the AC motor 6 to drive the electric vehicle through the AC motor 6. Although the DC fed electric vehicle is shown in FIG. 1 as an exemplary embodiment of the power converter, the embodiment can likewise be applied to an AC fed electric vehicle that is widely used for long-haul electric vehicles. When the embodiment is applied to the AC input electric vehicle, a transformer and a converter unit can be provided on the input side of the inverter INV.

The AC motor 6 shown in FIG. 1 is assumed to be a permanent-magnet synchronous motor; however, the AC motor 6 can be a motor other than a synchronous motor as long as the motor has a permanent magnet in its rotor. For example, an induction motor is known in the art in which a permanent magnet is embedded in a rotor of the motor. The structure and control based on the technical idea of the present invention can be applied to this kind of motor.

(Structure of Controller 10)

Figure 2:
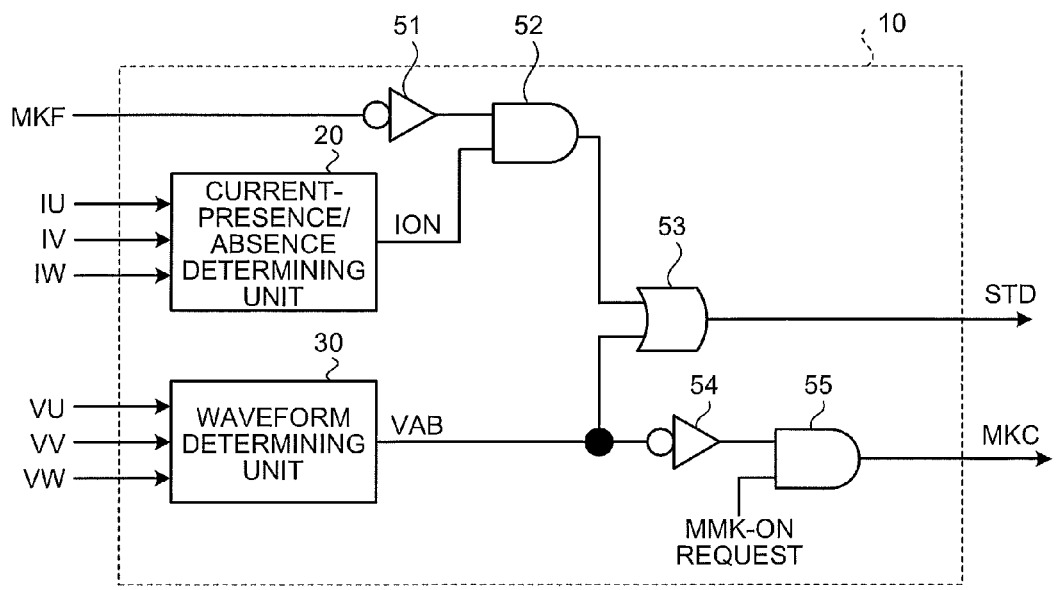
FIG. 2 is an example of a structure of a controller according to the embodiment of the present invention.

FIG. 2 is an example of a structure of the controller 10 according to the embodiment of the present invention. As shown at least in FIG. 2, the controller 10 includes a current presence/absence determining unit 20 that receives the currents IU, IV, and IW as inputs and determines presence or absence of a current, a waveform determining unit 30 that receives the voltage VU, VV, and VW as inputs and determines whether voltage waveforms are under abnormal conditions, and other circuits (logic circuits), i.e., NOT circuits (hereinafter, "NOT") 51 and 54, AND circuits (hereinafter, "AND") 52 and 55, and an OR circuit (hereinafter, "OR") 53.

As shown at least in FIG. 2, the signal MKF indicative of the main contact state of the contactor MMK is input to the controller 10. Moreover, the controller 10 outputs an abnormality detection signal STD to an external device managing apparatus, a brake control apparatus, and a power running-command circuit (none of them is shown), and outputs the closing signal MKC to the contactor MMK.

The controller 10 includes control functions for the inverter INV other than functions described above, functions required for the power converter of the electric vehicle including, for example, a function of protection from an overcurrent or an overvoltage in the power converter 100, a function of communication with respect to an external device managing apparatus (not shown) of the power converter 100, and a function of receiving commands (for example, receiving a command for power running of an electric vehicle or a brake command) from an external apparatus (not shown) such as a cab.

(Operation of Controller 10)

An operation of the controller 10 is explained next.

As shown in FIG. 2, when an output current is output from the inverter INV, the current presence/absence determining unit 20 determines that there is a current when any one of the currents IU, IV, and IW exceeds a predetermined value, for example, and the current presence/absence determining unit 20 outputs a signal ION.

At this time, the controller 10 outputs the abnormality detection signal STD when the contact state signal MKF of the contactor MMK is OFF (that is, when the contactor MMK is OFF) and the signal ION from the current presence/absence determining unit 20 is ON. The abnormality detection signal STD can be ON when the signal ION from the current presence/absence determining unit 20 is ON in a state where the closing signal MKC of the contactor MMK is OFF without using the contact state signal MKF. Such a case is based on assumption that the power converter 100 or the motor 6 is under an abnormal condition and the currents IU, IV, and IW keep flowing even if the contactor MMK is turned OFF. Such a case can occur for example when the contactor MMK is under the abnormal condition or a current is excessively great and the current cannot be interrupted by the contactor MMK.

Meanwhile, the waveform determining unit 30 outputs a signal VAB when the voltages VU, VV, and VW indicate abnormal values. For example, it is conceived that the waveform determining unit 30 determines an abnormality when a difference between effective values of the voltages VU, VV, and VW of each phase is equal to or greater than a predetermined value, and turns the signal VAB ON.

An operation for turning the signal VAB ON is explained based on an example where the electric vehicle is coasting at a certain speed. In a state where the inverter INV is turned OFF, the AC motor 6 is rotated by the wheel 3 and the rotor is rotating. Thus, the induced voltage caused by the AC motor 6 appears in the voltages VU, VV, and VW. A structure of a stator coil of the AC motor 6 is well known, and phase coils having an equal number of windings are equally accommodated in a slot in a stator core. Therefore, the induced voltages VU, VV, and VW of the AC motor 6 normally become symmetric three-phase AC voltages.

If an interphase short circuit or a ground fault occurs in a portion of the stator coil in the AC motor 6, the number of windings of the phase coils becomes different from each other equivalently. Therefore, the induced voltages do not become the symmetric three-phase AC voltages and become unbalanced three-phase AC voltages. That is, when the induced voltages in a state where the inverter INV is OFF are observed and compared with induced voltages that can be generated in a normal state, an abnormality of the AC motor 6 can be detected.

When the signal VAB is ON, the controller 10 turns the closing signal MKC of the contactor MMK OFF even if MMK-ON is requested by other functions of the controller 10. That is, when the signal VAB is ON, the contactor MMK is prohibited from closing.

By constituting the controller 10 as described above, when an abnormality occurs in the AC motor 6, the contactor MMK is prohibited from closing. As a result, it is possible to suppress expansion of such damage that an overcurrent is generated in the inverter INV and the inverter INV is damaged. When the signal VAB is produced, the abnormality detection signal STD can be turned ON as shown in FIG. 2.

(Flow of Operation When Abnormality Occurs)

A flow of an overall operation of the controller 10 when an abnormality occurs is explained next.

A case that a stator core is short-circuited during a driving operation of the electric vehicle in a state where the AC motor 6 is driven by the inverter INV is considered first. In this case, the currents IU, IV, and IW become excessively high. Therefore, the inverter INV is stopped by the overcurrent protection function (not shown) provided in the inverter INV, and the contactor MMK is turned OFF. However, there is a possibility that the abnormal current keeps flowing due to the induced voltage when the currents IU, IV, and IW are excessively greater than the interruption capacity of the contactor MMK or when an abnormal condition occurs in the contactor MMK and the current cannot be interrupted even if the contactor MMK is turned OFF. In this case, the current presence/absence determining unit 20 of the controller 10 compares values of currents output from the current detectors CTU, CTV, and CTW with a predetermined threshold value, for example, and determines presence or absence of a current. When there is a current, the signal ION is turned ON, thereby outputting the abnormality detection signal STD.

Meanwhile, even if the current could be interrupted by turning the contactor MMK OFF, there is a possibility that a short circuit occurs in the AC motor 6 when an induced voltage of the AC motor 6 is under an abnormal condition. To prepare for such a situation, the waveform determining unit 30 of the controller 10 compares a difference between the effective values of the voltages VU, VV, and VW of each phase with a predetermined threshold value, for example, thereby determining an abnormality of the induced voltage of the AC motor 6. When it is determined that the induced voltage is abnormal, the signal VAB is turned ON, the contactor MMK is prohibited from being closed (the closing signal MKC with respect to the contactor MMK is turned OFF), and the abnormality detection signal STD is output.

The abnormality detection signal STD is input to the external device managing apparatus, the brake control apparatus, the power running command circuit (none of them is shown). When the abnormality detection signal STD is ON, the abnormality detection signal STD can be used as a control signal for interrupting power running of the electric vehicle, and sufficiently reducing (including zeroing) the speed of the electric vehicle, that is, the number of revolutions of the AC motor 6 connected to the wheel 3 by applying a brake or the like.

As described above, according to the power converter of the embodiment, when the contactor MMK is damaged, when the currents IU, IV, and IW are excessively greater than the interruption capacity of the contactor MMK, when the current cannot be interrupted by the contactor MMK, or when an interphase short circuit or ground fault occurs in a portion of the stator coil in the AC motor 6, the closing signal MKC for controlling the prohibition of closing of the contactor MMK, or the abnormality detection signal STD indicative of presence or absence of an abnormality is output. Therefore, it is possible to sufficiently reduce the speed of the electric vehicle, to reduce the induced voltage of the AC motor 6 to a sufficiently small value, to sufficiently reduce (including zero) the magnitude of an abnormal current, and to prevent the damage of the power converter 100 or the AC motor 6 from becoming worse.

The structure described in the above embodiment is an example of contents of the present invention, and can be of course combined with another well-known technique or changed or modified, such as omitting a part of the structure, without departing from the scope of the present invention.

Further, in the present specification, although the present invention is mainly applied to a power converter provided in an electric vehicle, application of the present invention is not limited to electric vehicles, and the invention can be also applied to other relevant fields such as electric cars.

INDUSTRIAL APPLICABILITY

As described above, even when a current cannot be interrupted even if a contactor is turned OFF, or when a short circuit occurs between the contactor and a motor or between windings in the motor, the power converter of the present invention is effective as an invention capable of preventing the damage of the power converter or the motor from becoming worse.

The invention claimed is:

1. A power converter comprising:
    an inverter that converts a DC voltage or an AC voltage to an AC voltage of an arbitrary frequency to drive an AC motor having a permanent magnet therein;
    an opening/closing unit that is connected between the inverter and the AC motor;
    a controller that controls the inverter and the opening/closing unit;
    a voltage detector provided between the opening/closing unit and the AC motor; and
    a current detector provided between the inverter and the opening/closing unit, wherein when the inverter is turned OFF, the controller compares an induced voltage in a state where the inverter is turned OFF with an induced voltage in a normal state to detect abnormality of the AC motor,
    wherein when the AC motor is in an abnormal state, the controller turns OFF the opening/closing unit, and
    wherein when a current larger than a predetermined threshold value is still detected by the current detector even though the opening/closing unit is turned OFF, the controller determines that the opening/closing unit is in an abnormal state or the current is excessive as compared with an interruption capacity of the opening/closing unit, and performs a predetermined procedure to reduce a number of revolutions of the AC motor.

2. The power converter according to claim 1, wherein the controller includes a logic circuit that controls the opening/closing unit to be turned OFF even if there was an ON-request of the opening/closing unit upon determining that the AC motor is in an abnormal state, to prohibit the opening/closing unit from closing again.

3. The power converter according to claim 1, wherein the controller determines that the AC motor is in an abnormal state if a difference between phase voltages of the AC motor detected by the voltage detector exceeds a predetermined value.

4. The power converter according to claim 1, wherein the predetermined procedure includes an operation of outputting a control signal for decelerating an electric vehicle provided with the power converter.

5. The power converter according to claim 1, wherein the predetermined procedure includes an operation for outputting a control signal for applying a brake to an electric vehicle provided with the power converter.

6. The power converter according to claim 1, wherein the predetermined procedure includes an operation for outputting a control signal for turning OFF power running of an electric vehicle provided with the power converter.

7. A power converter comprising:
    an inverter that converts a DC voltage or an AC voltage to an AC voltage of an arbitrary frequency to drive an AC motor having a permanent magnet therein;
    an opening/closing unit that is connected between the inverter and the AC motor;
    a voltage detector provided between the opening/closing unit and the AC motor;
    a controller that controls the inverter and the opening/closing unit, and
    a current detector provided between the inverter and the opening/closing unit, wherein when the inverter is turned OFF, the controller compares an induced voltage in a state where the inverter is turned OFF with an induced voltage in a normal state to detect abnormality of the AC motor,
    wherein when the AC motor is in an abnormal state, the controller turns OFF the opening/closing unit, and
    wherein when an abnormal induced voltage is still detected by the voltage detector even though the opening/closing unit is turned OFF, the controller determines that there is a possibility that an interphase short circuit or ground fault occurs in a part of a stator coil of the AC motor, and performs a predetermined procedure to reduce a number of revolutions of the AC motor.

8. The power converter according to claim 7, wherein the controller includes a logic circuit that controls the opening/closing unit to be turned OFF even if there was an ON-request of the opening/closing unit upon determining that the AC motor is in an abnormal state, to prohibit the opening/closing unit from closing again.

9. The power converter according to claim 7, wherein the controller determines that the AC motor is in an abnormal state if a difference between phase voltages of the AC motor detected by the voltage detector exceeds a predetermined value.

10. The power converter according to claim 7, wherein the predetermined procedure includes an operation of outputting a control signal for decelerating an electric vehicle provided with the power converter.

11. The power converter according to claim 7, wherein the predetermined procedure includes an operation for outputting a control signal for applying a brake to an electric vehicle provided with the power converter.

12. The power converter according to claim 7, wherein the predetermined procedure includes an operation for outputting a control signal for turning OFF power running of an electric vehicle provided with the power converter OFF.

* * * * *